(12) United States Patent
Huang et al.

(10) Patent No.: US 12,183,196 B2
(45) Date of Patent: Dec. 31, 2024

(54) VEHICLE CONTROL METHOD AND APPARATUS, DEVICE AND COMPUTER STORAGE MEDIUM

(71) Applicant: BEIJING BAIDU NETCOM SCIENCE TECHNOLOGY CO., LTD., Beijing (CN)

(72) Inventors: Jizhou Huang, Beijing (CN); Deguo Xia, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/753,817

(22) PCT Filed: Nov. 17, 2021

(86) PCT No.: PCT/CN2021/131186
§ 371 (c)(1),
(2) Date: Mar. 15, 2022

(87) PCT Pub. No.: WO2022/267312
PCT Pub. Date: Dec. 29, 2022

(65) Prior Publication Data
US 2024/0062654 A1 Feb. 22, 2024

(30) Foreign Application Priority Data
Jun. 22, 2021 (CN) .......................... 202110691245.3

(51) Int. Cl.
*G08G 1/0968* (2006.01)
*B60W 30/18* (2012.01)
(Continued)

(52) U.S. Cl.
CPC ..... *G08G 1/0968* (2013.01); *B60W 30/18018* (2013.01); *B60W 40/04* (2013.01);
(Continued)

(58) Field of Classification Search
None
See application file for complete search history.

(56) References Cited

U.S. PATENT DOCUMENTS

2014/0210645 A1* 7/2014 Sharma .................... G08G 1/22
340/907
2016/0335890 A1 11/2016 Bernhardt et al.
(Continued)

FOREIGN PATENT DOCUMENTS

CN 107103769 A 8/2017
CN 107452218 A 12/2017
(Continued)

OTHER PUBLICATIONS

Extended European Search Report for EP21865346.7, issued on Nov. 17, 2022, 14 pgs.
(Continued)

*Primary Examiner* — Tuan C To
*Assistant Examiner* — David Ruben Pedersen
(74) *Attorney, Agent, or Firm* — Kwan & Olynick LLP

(57) ABSTRACT

A vehicle control method and apparatus, a device and a computer storage medium are disclosed, which relates to the technical fields of autonomous driving and intelligent transportation. A specific implementation solution involves: determining vehicles in a preset geo-fencing region; determining a vehicle weight of each said vehicles according to a vehicle type and a waiting duration of each said vehicles; estimating, according to the vehicle weights of the vehicles in each of lanes in the geo-fencing region and positions of the vehicles in each said lanes, a duration to be waited in
(Continued)

each said lanes; and generating a control instruction for each said vehicles according to the respective durations to be waited in each said lanes and the respective positions of the vehicles in each said lanes, the control instruction including a state instruction and/or a target speed instruction.

14 Claims, 4 Drawing Sheets

(51) Int. Cl.
    *B60W 40/04*     (2006.01)
    *G08G 1/01*     (2006.01)
    *G08G 1/052*     (2006.01)
    *G08G 1/08*     (2006.01)
    *G08G 1/0967*     (2006.01)

(52) U.S. Cl.
    CPC ......... *G08G 1/0112* (2013.01); *G08G 1/0133* (2013.01); *G08G 1/0145* (2013.01); *G08G 1/052* (2013.01); *G08G 1/08* (2013.01); *G08G 1/096725* (2013.01); *G08G 1/096783* (2013.01)

(56) References Cited

U.S. PATENT DOCUMENTS

| | | | |
|---|---|---|---|
| 2017/0001642 A1* | 1/2017 | Kumai | B60W 30/16 |
| 2018/0174449 A1* | 6/2018 | Nguyen | G08G 1/015 |
| 2018/0204450 A1 | 7/2018 | Song et al. | |
| 2019/0244518 A1* | 8/2019 | Cheng | G08G 1/096725 |
| 2022/0092874 A1 | 3/2022 | Gao | |

FOREIGN PATENT DOCUMENTS

| | | | | |
|---|---|---|---|---|
| CN | 107507430 | A | 12/2017 | |
| CN | 107919022 | A | 4/2018 | |
| CN | 110619752 | A | 12/2019 | |
| CN | 110660234 | A | 1/2020 | |
| CN | 107452218 | B | 4/2020 | |
| CN | 111081037 | A | 4/2020 | |
| CN | 111102985 | A | 5/2020 | |
| CN | 111275990 | A * | 6/2020 | ............... G08G 1/07 |
| CN | 111081037 | B | 4/2021 | |
| CN | 112638737 | A | 4/2021 | |
| CN | 112712712 | A | 4/2021 | |
| CN | 112802325 | A | 5/2021 | |
| CN | 110619752 | B | 9/2021 | |
| CN | 113335292 | A | 9/2021 | |
| JP | 2007317019 | A | 12/2007 | |
| JP | 2011221854 | A | 11/2011 | |
| JP | 2019185772 | A | 10/2019 | |
| WO | 2017045147 | A1 | 3/2017 | |
| WO | 2020263214 | A1 | 12/2020 | |

OTHER PUBLICATIONS

Chinese Office Action for CN patent application 202110691245.3, dated Nov. 8, 2021, 5 pages.
International Search Report for PCT/CN2020/131186 issued on Mar. 2, 2022, 5 pgs.
First Office Action for JP2022-517191, issued on Aug. 29, 2023, 6 pgs.
Notice of allowance for EP21865346.7, issued on Sep. 4, 2023, 46 pgs.
First Office Action for KR10-2022-7008611, issued on Aug. 26, 2024, 5 pgs.

* cited by examiner

VEHICLE CONTROL METHOD AND APPARATUS, DEVICE AND COMPUTER STORAGE MEDIUM

This application is a national application and, pursuant to 35 U.S.C. § 371, is entitled to and claims the right of priority based on PCT application no. PCT/CN2021/131186, filed Nov. 17, 2021, which claims priority to Chinese Patent application Ser. No. 20/2110691245.3, filed on Jun. 22, 2021, with the title of "VEHICLE CONTROL METHOD AND APPARATUS, DEVICE AND COMPUTER STORAGE MEDIUM", all of which are incorporated by reference in their entirety.

FIELD OF THE DISCLOSURE

The present disclosure relates to the technical field of computers, and in particular, to the technical fields of autonomous driving and intelligent transportation.

BACKGROUND OF THE DISCLOSURE

Convenient transportation not only helps people travel, but also provides an important foundation for social and economic growth. As vehicle population constantly increases, travel demands continue to rise, and cities continue to grow in size, congestion has become a major problem that cannot be ignored during urban development. On the one hand, traffic congestion makes people spend a lot of time on travel, increasing costs of travel. On the other hand, vehicles cut each other off, leading to rear-end collision, traffic jam and even serious traffic accidents, resulting in casualties and huge economic losses.

Therefore, how to alleviate traffic congestion has become an urgent problem in the fields of intelligent transportation and autonomous driving.

SUMMARY OF THE DISCLOSURE

In view of the above, the present disclosure provides a vehicle control method and apparatus, a device and a computer storage medium, so as to alleviate traffic congestion.

According to a first aspect of the present disclosure, a method for vehicle control is provided, including:
  determining vehicles in a preset geo-fencing region;
  determining a vehicle weight of each said vehicles according to a vehicle type and a waiting duration of each said vehicles;
  estimating, according to the vehicle weights of the vehicles in each of lanes in the geo-fencing region and positions of the vehicles in each said lanes, a duration to be waited in each said lanes; and
  generating a control instruction for each said vehicles according to the respective durations to be waited in each said lanes and the respective positions of the vehicles in each said lanes, the control instruction comprising a state instruction and/or a target speed instruction.

According to a second aspect of the present disclosure, an apparatus for vehicle control is provided, including:
  a decision-making trigger unit configured to determine vehicles in a preset geo-fencing region;
  a first decision-making unit configured to determine a vehicle weight of each said vehicles according to a vehicle type and a waiting duration of each said vehicles;
  a second decision-making unit configured to estimate, according to the vehicle weights of the vehicles in each of lanes in the geo-fencing region and positions of the vehicles in each said lanes, a duration to be waited in each said lanes; and
  a third decision-making unit configured to generate a control instruction for each said vehicles according to the respective durations to be waited in each said lanes and the respective positions of the vehicles in each said lanes, the control instruction comprising a state instruction and/or a target speed instruction.

According to a third aspect of the present disclosure, a vehicle control system is provided, including: an on board unit arranged in a vehicle, a road side unit and a mobile edge computing device;
  the on board unit being configured to send information of the vehicle to the road side unit after establishing a connection with the road side unit; receive a control instruction sent by the road side unit and send the control instruction to the vehicle control system to execute the control instruction;
  the road side unit being configured to send the received information of the vehicle to the mobile edge computing device after establishing a connection with the on board unit; and forward a control instruction sent by the mobile edge computing device to the on board unit of the corresponding vehicle; and
  the mobile edge computing device including the apparatus for vehicle control described above.

According to a fourth aspect of the present disclosure, an electronic device is provided, including:
  at least one processor; and
  a memory in communication connection with the at least one processor; wherein
  the memory stores instructions executable by the at least one processor, and the instructions are executed by the at least one processor to enable the at least one processor to perform the method as described above.

According to a fifth aspect of the present disclosure, a non-transitory computer-readable storage medium storing computer instructions is provided, wherein the computer instructions are configured to cause a computer to perform the method as described above.

According to a sixth aspect of the present disclosure, a computer program product including a computer program is provided, wherein, when the computer program is executed by a processor, the method as described above is performed.

As can be seen from the above technical solutions, in the present disclosure, the vehicles in the geo-fencing region are globally planned and controlled according to information such as vehicle types, waiting durations and positions in the lanes, and control instructions for the vehicles are generated, to effectively alleviate traffic congestion.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The accompanying drawings are intended to provide a better understanding of the solutions and do not constitute a limitation on the present disclosure. In the drawings.

DETAILED DESCRIPTION OF PREFERRED EMBODIMENTS

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

Traffic congestion generally occurs at traffic bottleneck points, including intersections, junctions, etc. Current vehicle control for the traffic bottlenecks comes from traffic lights or depends on behaviors of individual drivers. Such manners lead to the following main problems.

1) The traffic lights are poor in control flexibility, and it is difficult to achieve high-quality control under traffic bottlenecks.
2) The dependence on behaviors and judgment of drivers easily leads to vehicle rear-end collision or traffic congestion due to individual driving behaviors, and causes unfairness of right of way at the same time.
3) Existing autonomous driving solutions are based on single-vehicle intelligence and lack global control capability, which cannot solve the problems such as the difficulty for emergency vehicles to pass quickly.

In view of the above, the present disclosure provides a new vehicle control method to relieve traffic congestion. In order to facilitate the understanding of the present disclosure, the system involved in the present disclosure is briefly described first.

Figure 1:
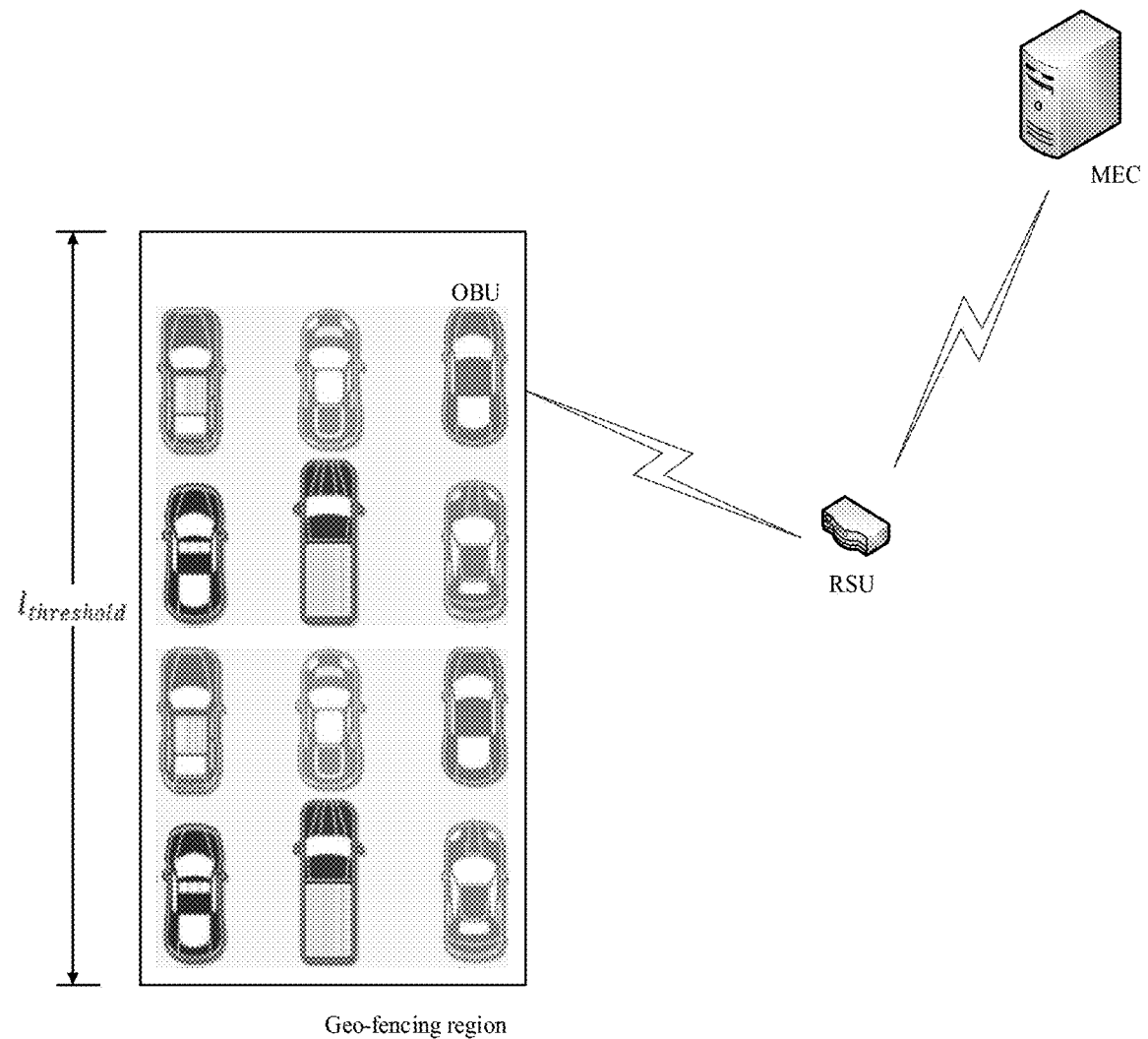
FIG. 1 is a system architecture diagram applicable to embodiments of the present disclosure.

FIG. 1 is a system architecture diagram applicable to embodiments of the present disclosure. Vehicles involved in the present disclosure may be vehicles with an automatic driving function or an aided driving function. The vehicles are each provided with an On Board Unit (OBU). The vehicles provided with the OBU can communicate with a Road Side Unit (RSU) erected on a road side through a Vehicle to Everything (V2X), and acquire vehicle control instructions from the RSU. The OBU requires integrated communication chips and modules that interact with a control unit of the vehicle.

The RSU is mounted to the road side and configured to collect information such as current vehicle conditions, road conditions and traffic conditions. The information is transmitted through a communication network to a Mobile Edge Computing device (MEC) for processing. A processing result of the MEC is received and then sent to the OBU.

The MEC provides a service environment, computing and storage functions within a Radio Access Network (RAN).

The OBU and the RSU may communicate through a Dedicated Short Range Communication (DSRS) or Cellular V2X (C-V2X) technology.

In the present disclosure, the geo-fencing region may be arranged in places prone to traffic congestion such as intersections and junctions. One RSU may be responsible for one or more geo-fencing regions correspondingly. Vehicles entering the geo-fencing region communicate with the RSU and are controlled by instructions from the RSU. The RSU reports vehicle information in the geo-fencing region to the MEC, the MEC generates a vehicle control instruction and returns it to the RSU, and the RSU sends it to a corresponding vehicle. In the present disclosure, the MEC globally controls the vehicles in the geo-fencing region.

Figure 2:
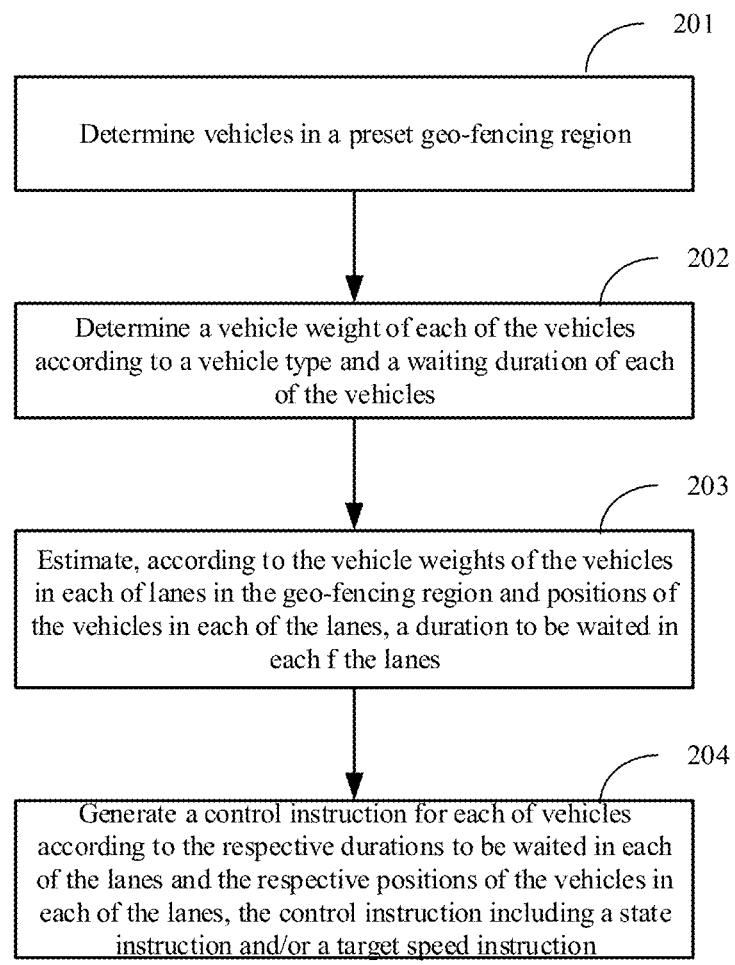
FIG. 2 is a flowchart of a method for vehicle control according to an embodiment of the present disclosure.

FIG. 2 is a flowchart of a method for vehicle control according to an embodiment of the present disclosure. The method may be performed by an apparatus for vehicle control. The apparatus may be located in the MEC shown in FIG. 1, which may be an application in the MEC or a functional unit in the MEC such as a plug-in or a Software Development Kit (SDK). As shown in FIG. 2, the method may include the following steps.

In 201, vehicles in a preset geo-fencing region are determined.

In 202, a vehicle weight of each said vehicles is determined according to a vehicle type and a waiting duration of each said vehicles.

In 203, according to the vehicle weights of the vehicles in each of lanes in the geo-fencing region and positions of the vehicles in each said lanes, a duration to be waited in each said lanes is estimated.

In 204, a control instruction is generated for each said vehicles according to the respective durations to be waited in each said lanes and the respective positions of the vehicles in each said lanes, wherein the control instruction includes a state instruction and/or a target speed instruction.

As can be seen from the above technical solutions, in the present disclosure, the vehicles in the geo-fencing region are globally planned and controlled according to information such as vehicle types, waiting durations and positions in the lanes, and control instructions for the vehicles are generated, which reduces traffic congestion and other problems caused by individual actions such as road cutting and is more flexible and global than a traditional traffic light control method.

The above steps are described in detail below with reference to embodiments.

Firstly, step 201 "determining vehicles in a preset geofencing region" is described in detail with reference to embodiments.

The geo-fencing region may be set up in advance in places prone to traffic congestion, such as intersections and junctions prone to traffic congestion and requiring vehicle scheduling. The geo-fencing region is a part of a region demarcated on a geographical location, which may include N lanes, the included lanes having a length of $l_{threshold}$, where N is an integer greater than 1. As shown in FIG. 1, the geo-fencing region includes 3 lanes, the included lanes having a length of $l_{threshold}$. It may be determined, according to positions of the vehicles, whether the vehicles fall within the geo-fencing region. The vehicles in the geo-fencing region may be vehicles of multiple types, which may fill the geo-fencing region or may have vacant positions.

Once establishing a connection with the RSU, the OBU on each vehicle may send information such as its own positioning result, vehicle identifier and vehicle type to the RSU. The RSU sends the information of the vehicles to the MEC. The MEC determines, according to position information of the vehicles, vehicles falling within the geo-fencing region corresponding to the RSU. That is, a correspondence among the geo-fencing region, the vehicles and the RSU is determined.

Furthermore, after determining the vehicles falling within the geo-fencing region, the MEC is required to determine information of lanes where the vehicles are located. This may be performed by using, but not limited to, the following manners.

In a first manner, the MEC acquires information of the lanes of the vehicles determined by OBU combined cameras of the vehicles.

The OBUs of the vehicles may acquire pictures taken by vehicle-mounted cameras and identify information of the lanes of the vehicles from the pictures based on a certain algorithm, and then send the information of the lanes to the RSU, and the RSU sends the information to the MEC.

In a second manner, the MEC acquires information of the lanes of the vehicles determined by the vehicles according to vehicle positioning results and lane-level map data.

The vehicles may determine information of the lanes of the vehicles based on their own position information and lane-level map data deployed on the vehicle, and then send the information of the lanes to the RSU, and the RSU sends the information to the MEC.

In a third manner, the MEC acquires vehicle positioning results, and determines information of the lanes of the vehicles according to lane-level map data deployed in the MEC.

In this manner, the MEC matches the position information of the vehicles on the lane-level map data to determine the lanes of the vehicles. The lane-level map data refers to a map with lane division data, that is, a map with lane information that can be defined from map data.

Step 202 "determining vehicle weights of the vehicles according to vehicle types and waiting durations" is described in detail below with reference to embodiments.

It is assumed that, in a set scenario of an intersection, N lanes $\{L_1, L_2, \ldots, L_N\}$ within a limited length $l_{threshold}$ exist. At a current time t, the lane $L_i$ includes $N_i$ vehicles $\{C_{i,1}, C_{i,2}, \ldots, C_{i,N_i}\}$. For each vehicle $C_{i,j} = \{T_{i,j}, t_{i,j,s}, l_{i,j,t}, s_{i,j,t}\}$, where $T_{i,j}$ denotes a vehicle type, ordinary vehicles, buses, fire engines, ambulances, police cars, etc. $t_{i,j,s}$ denotes the time when the vehicle enters the lane $L_i$. $l_{i,j,t}$ denotes current position coordinates of the vehicle, and $s_{k,j,t}$ denotes a current speed of the vehicle.

The vehicle weights of the vehicles reflect priorities of passage of the vehicles, which are mainly determined by vehicle types and waiting durations (i.e., durations that have been waited). On the one hand, priority is required to be given to some special types of vehicles; on the other hand, the waiting durations of vehicles cannot be excessively long, so as to ensure fairness. Therefore, the higher the weight of the vehicle type, the greater the vehicle weight; the longer the waiting duration of the vehicle, the greater the vehicle weight.

For example, the vehicle weight $W_{C_{k,j}}$ of the vehicle $C_{i,j}$ may be:

$$W_{C_{i,j}} = w_{T_{i,j}} * (t - t_{i,j,s}) \tag{1}$$

where $w_{T_{i,j}}$ denotes the weight of the vehicle type, which is determined by the vehicle type. For example, the vehicle types of the police cars, the ambulances and the fire engines have a higher weight to ensure their priority of passage; the weight of the vehicle type of the buses is second, and the weight of the ordinary vehicles is third. $t - t_{i,j,s}$ denotes the waiting duration of the vehicle. In addition to the above vehicle types and waiting durations, other factors may also be combined to determine the vehicle weights, which is not described in detail herein.

By incorporating vehicle types and waiting durations into vehicle weights, timely and fast passage of specific vehicles can be ensured in a global regulation manner of classifying vehicle types. Also, overall consideration is given to the fair right of passage of all vehicles.

Step 203 "estimating, according to the vehicle weights of the vehicles in lanes in the geo-fencing region and positions of the vehicles in the lanes, durations to be waited in the lanes" is described in detail below with reference to embodiments.

In the present disclosure, the reason why there is a need to estimate the waiting duration for each lane, instead of directly estimating the waiting duration of each vehicle according to the vehicle weight, is that vehicles are restricted by each lane and can only pass in their respective lanes. Therefore, there is a need to determine the duration to be waited in each lane, which is actually the waiting duration for the vehicle at the first place of each lane to wait, and then determine a state or a target speed of each vehicle at a current time in turn.

In this step, weights of the lanes may be determined according to the vehicle weights of the vehicles in lanes in the geo-fencing region; and then the durations to be waited in the lanes are estimated according to the weights of the lanes, the vehicle weights and the positions of the vehicles in the lanes.

As one implementation, in the determination of the weight of each lane, an average value of the vehicle weights of the vehicles (in the geo-fencing region) in the lane may be taken as the weight of the lane. For example, the weight $W_{L_i}$ of the lane $L_i$ may be:

$$W_{L_i} = \frac{1}{N_i} \sum_{j=1}^{N_i} W_{C_{i,j}} \tag{2}$$

where $N_i$ denotes a number of the vehicles in the lane $L_i$ within the geo-fencing region.

In addition to the above implementation, other manners may also be adopted. For example, a median or a sum of the vehicle weights of the vehicles in the lane is taken as the weight of the lane, and so on.

When the durations to be waited in the lanes are estimated, the lanes may be ranked according to weights. For the lane with the highest weight, the duration to be waited is zero. That is, the first vehicle in the lane with the highest weight may pass.

For other lanes, the durations to be waited in the lanes may be determined through the following steps.

In step S1, queuing weights of the vehicles in the lanes are determined according to the vehicle weights of the vehicles in the lanes.

Vehicles in the lanes may affect the passage of subsequent vehicles. If there are subsequent vehicles with a high weight, in order to ensure that the vehicle with a high weight can pass as quickly as possible, the vehicles before it is also required to have a high ranking weight. For example, if there is an ambulance in a lane, in order for the ambulance to pass as quickly as possible, vehicles before it are also required to have a high queuing weight. Therefore, a ranking weight of a vehicle is not only related to its own vehicle weight, but also related to vehicle weights of subsequent vehicles.

As one implementation, an average value of weights of a vehicle and vehicles after the vehicle in the lane a queuing weight of the vehicle. For example, the queuing weight $W_{C_{k,j}}^S$ of the vehicle $C_{i,j}$ is:

$$W_{C_{i,j}}^S = \frac{1}{N_i - j + 1} \sum_{k=j}^{N_i} W_{C_{i,k}} \quad (3)$$

In addition to the above implementation, other manners may also be adopted. For example, a median or a sum of the vehicle weights of the vehicle and vehicles thereafter is taken as the weight of the lane, and so on.

In step S2, a number of vehicles to be waited by first vehicles in the lanes is determined according to the queuing weights of the vehicles in the lanes.

After the queuing weight of each vehicle is known, the number of vehicles to be waited by the first vehicle in the lane can be known, that is, how many vehicles pass before the first vehicle in the lane passes. For example, the queuing weights of all the vehicles are ranked, and if the first vehicle in the lane $L_i$ is ranked k th, the number $N_{L_i}^w$ of vehicles to be waited is:

$$N_{L_i}^w = k - 1 \quad (4)$$

In step S3, durations to be waited in the lanes are determined according to the number of vehicles to be waited by the first vehicles in the lanes and unit time for the vehicles to pass.

Products of the number of vehicles to be waited by the first vehicles in the lanes and the unit time for the vehicles to pass may be taken as the durations to be waited in the lanes. For example, the duration $t_{L_i}^w$ to be waited in the lane $L_i$ may be:

$$t_{L_i}^w = N_{L_i}^w * \Delta t \quad (5)$$

where $\Delta t$ denotes the unit time for the vehicle to pass, which may be an empirical or experimental value.

Step 204 "generating control instructions for the vehicles according to the durations to be waited in the lanes and the positions of the vehicles in the lanes" is described in detail below.

In this step, the control instructions generated for the vehicles may include only a state instruction to indicate what state the vehicle is in, for example, start, keep, slow and stop. The control instructions may also include only a target speed instruction to indicate what speed the vehicle has achieved. The control instructions may also include both a state instruction and a target speed instruction.

When the state instruction $C'_{i,j}$ and a target speed $s_{i,j}^t$ are generated for the vehicle $C_{i,j}$, the following situations may be included.

In a first situation, if a current speed $s_{i,j,t}$ of a vehicle is zero, a time $t_{L_i}^w$ for the vehicle to wait in the lane is zero, and the vehicle is at the first place in the lane, that is, j is 0, a start instruction is generated for the vehicle, and a target speed $s_{i,j}^t$ of the vehicle is determined as a preset regular speed. For example, an average speed of a city road may be taken.

In a second situation, if an estimated start speed $s_{i,j}^p$ of the vehicle is greater than or equal to a preset maximum speed threshold $s_{max}$, the start instruction is generated for the vehicle, and the target speed of the vehicle is determined as the preset regular speed.

The estimated start speed $s_{i,j}^p$ refers to a maximum speed at which the vehicle can be assumed to start. The speed is related to a front spacing of the vehicle and the duration $t_{L_i}^w$ for the vehicle to wait in the lane. That is, it is assumed that the vehicle is now starting at a maximum speed within $t_{L_i}^w$ at which the vehicle does not exit a stop line or collide with a vehicle in front. For example, $$s_{i,j}^p = \frac{\Delta l}{t_{L_i}^w} \quad (6)$$

If the vehicle $C_{i,j}$ is the first vehicle of the lane $L_i$, then $\Delta l$ is a distance between a current position of the vehicle and a position of a stop line of the lane. Otherwise, $\Delta l$ denotes a position distance between the vehicle $C_{i,j}$ and the vehicle in front.

$s_{max}$ is a preset value, which may be, for example, 15 m/s on a city road.

In a third situation, if a front spacing $\Delta l$ of the vehicle is greater than or equal to a preset maximum spacing threshold $l_{max}$, the start instruction is generated for the vehicle, and the target speed of the vehicle is determined as the preset regular speed.

That is, if the front spacing of the vehicle is excessively large, the vehicle may start moving forward to prevent a waste of resources in the lane. The maximum spacing threshold $l_{max}$ may be an empirical or experimental value, such as 3 times of $\Delta l$.

In a fourth situation, if the estimated start speeds $s_{i,j}^p$ of the vehicle is greater than or equal to the current speed $s_{i,j,t}$ of the vehicle, a keep instruction is generated for the vehicle, and the target speed of the vehicle is determined as the current speed. That is, in this case, the vehicle just keeps going at the current speed.

In a fifth situation, if the estimated start speed $s_{i,j}^p$ of the vehicle is less than the current speed $s_{i,j,t}$ of the vehicle and greater than a preset minimum speed threshold $s_{min}$, a slow instruction is generated for the vehicle, and the target speed of the vehicle is determined as the estimated start speed $s_{i,j}^p$ of the vehicle.

In a sixth situation, if the estimated start speed $s_{i,j}^p$ of the vehicle is less than or equal to the preset minimum speed threshold $s_{min}$, a stop instruction is generated for the vehicle, and the target speed of the vehicle is determined as zero.

In a seventh situation, if the front spacing $\Delta l$ of the vehicle is less than or equal to a preset minimum spacing threshold $l_{min}$, in order to ensure security, the stop instruction is generated for the vehicle, and the target speed of the vehicle is determined as zero.

Then, the MEC sends a control instruction to the RSU (that is, the RSU corresponding to the geo-fencing region), and the RSU sends the control instruction to the OBU of the corresponding vehicle. The OBU of the vehicle provides the control instruction for a control system of the vehicle, and the control system executes the control instruction. That is, the vehicle is started, kept, slowed or stopped according to the state instruction, and is adjusted to the target speed.

The above is a detailed description of the method according to the present disclosure, and the following is a detailed with reference to embodiments.

Figure 3:
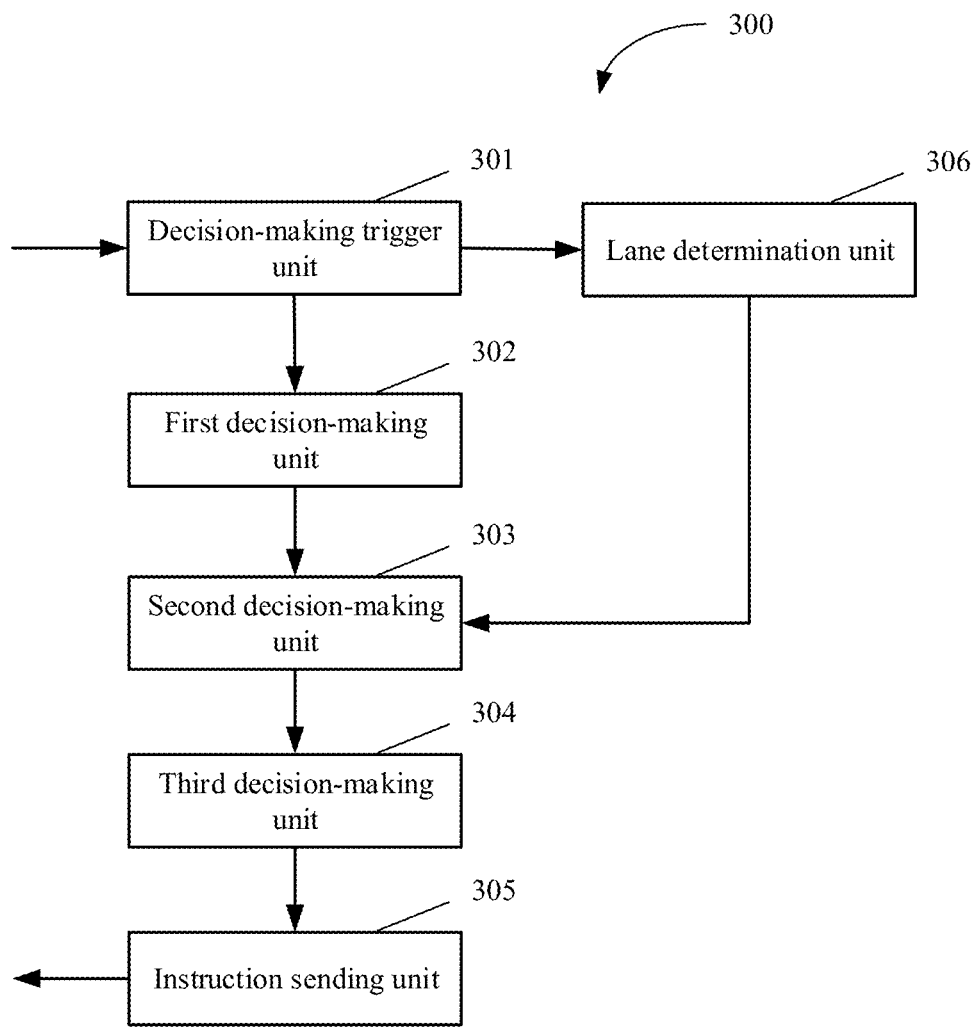
FIG. 3 is a schematic structural diagram of an apparatus for vehicle control according to an embodiment of the present disclosure.

FIG. 3 is a schematic structural diagram of an apparatus for vehicle control according to an embodiment of the present disclosure. The apparatus is arranged in an MEC. As shown in FIG. 3, the apparatus 300 may include: a decision-making trigger unit 301, a first decision-making unit 302, a second decision-making unit 303 and a third decision-making unit 304, and may further include an instruction sending unit 305 and a lane determination unit 306. Main functions of the component units are as follows.

The decision-making trigger unit 301 is configured to determine vehicles in a preset geo-fencing region.

The first decision-making unit 302 is configured to determine a vehicle weight of each said vehicles according to a vehicle type and a waiting duration of each said vehicles.

The second decision-making unit 303 is configured to estimate, according to the vehicle weights of the vehicles in each of lanes in the geo-fencing region and positions of the vehicles in each said lanes, a duration to be waited in each said lanes.

The third decision-making unit 304 is configured to generate a control instruction for each said vehicles according to the respective durations to be waited in each said lanes and the respective positions of the vehicles in each said lanes, the control instruction including a state instruction and/or a target speed instruction.

As one implementation, the decision-making trigger unit 301 may determine vehicle positions, determine whether the vehicle positions fall within the preset geo-fencing region, and determine a road side unit corresponding to the geo-fencing region.

The instruction sending unit 305 is configured to send the control instructions to corresponding vehicles through the road side unit corresponding to the geo-fencing region.

The lane determination unit 306 is configured to determine the lanes where the vehicles are located. This may be performed by using, but not limited to, the following three manners:
  acquiring information of the lanes of the vehicles determined by on board unit combined cameras of the vehicles; or
  acquiring information of the lanes of the vehicles determined by the vehicles according to vehicle positioning results and lane-level map data; or
  acquiring vehicle positioning results, and determine information of the lanes of the vehicles according to lane-level map data deployed in a mobile edge computing device.

As one implementation, the second decision-making unit 303 may determine weights of the lanes according to the vehicle weights of the vehicles in lanes in the geo-fencing region; and estimate, according to the weights of the lanes, the vehicle weights and the positions of the vehicles in the lane, the durations to be waited in the lanes.

As one preferred implementation, when estimating, according to the weights of the lanes, the vehicle weights and the positions of the vehicles in the lanes, the durations to be waited in the lanes, the second decision-making unit 303 determines, for the lane with the highest weight, the duration to be waited in the lane as zero; and for other lanes, determines queuing weights of the vehicles in the lanes according to the vehicle weights of the vehicles in the lanes; determines a number of vehicles to be waited by first vehicles in the lanes according to the queuing weights of the vehicles in the lanes; and determines durations to be waited in the lanes according to the number of vehicles to be waited by the first vehicles in the lanes and unit time for the vehicles to pass.

As one implementation, the third decision-making unit 304 may generate the state instruction in the following situations of:
  generating a start instruction for a vehicle if a current speed of the vehicle is zero, a duration for the vehicle to wait in the lane is zero, and the vehicle is at the first place in the lane;
  generating the start instruction for the vehicle if an estimated start speed of the vehicle is greater than or equal to a preset maximum speed threshold;
  generating the start instruction for the vehicle if a front spacing of the vehicle is greater than or equal to a preset maximum spacing threshold;
  generating a keep instruction for the vehicle if the estimated start speed of the vehicle is greater than or equal to the current speed of the vehicle;
  generating a slow instruction for the vehicle if the estimated start speed of the vehicle is less than the current speed of the vehicle and greater than a preset minimum speed threshold;
  generating a stop instruction for the vehicle if the estimated start speed of the vehicle is less than or equal to the preset minimum speed threshold; and
  generating the stop instruction for the vehicle if the front spacing of the vehicle is less than or equal to the preset minimum spacing threshold;
  wherein the estimated start speed of the vehicle is determined by the front spacing of the vehicle and the duration for the vehicle to wait in the lane.

As another implementation, the third decision-making unit 304 may generate the target speed instruction in the following situations of:
  determining a target speed of a vehicle as a preset regular speed if a current speed of the vehicle is zero, a duration for the vehicle to wait in the lane is zero, and the vehicle is at the first place in the lane;
  determining the target speed of the vehicle as the preset regular speed if an estimated start speed of the vehicle is greater than or equal to a preset maximum speed threshold;
  determining the target speed of the vehicle as the preset regular speed if a front spacing of the vehicle is greater than or equal to a preset maximum spacing threshold;
  determining the target speed of the vehicle as the current speed if the estimated start speed of the vehicle is greater than or equal to the current speed of the vehicle;
  determining the target speed of the vehicle as the estimated start speed of the vehicle if the estimated start speed of the vehicle is less than the current speed of the vehicle and greater than a preset minimum speed threshold, the estimated start speed of the vehicle being determined by the front spacing of the vehicle and the duration for the vehicle to wait in the lane;
  determining the target speed of the vehicle as zero if the estimated start speed of the vehicle is less than or equal to the preset minimum speed threshold; and
  determining the target speed of the vehicle as zero if the front spacing of the vehicle is less than or equal to the preset minimum spacing threshold.

Various embodiments in the specification are described progressively. Same and similar parts among the embodiments may be referred to one another, and each embodiment focuses on differences from other embodiments. In particular, the apparatus embodiments are basically similar to the method embodiments, so the description thereof is relatively simple. Related parts may be obtained with reference to the corresponding description in the method embodiments.

According to embodiments of the present disclosure, the present disclosure further provides an electronic device, a readable storage medium and a computer program product.

Figure 4:
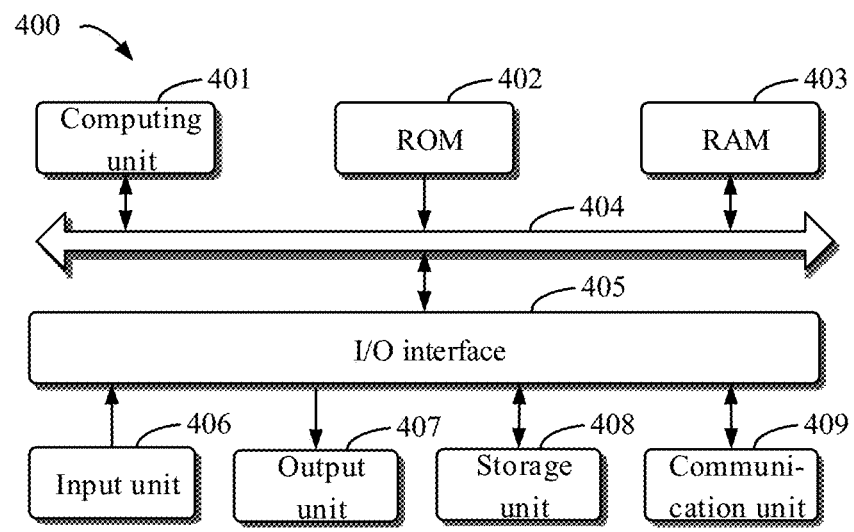
FIG. 4 is a block diagram of an electronic device configured to implement embodiments of the present disclosure.

FIG. 4 is a block diagram of an electronic device configured to perform a method for vehicle control according to embodiments of the present disclosure. The electronic device is intended to represent various forms of digital computers, such as laptops, desktops, workbenches, personal digital assistants, servers, blade servers, mainframe computers and other suitable computing devices. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or required herein.

As shown in FIG. 4, the device 400 includes a computing unit 401, which may perform various suitable actions and processing according to a computer program stored in a read-only memory (ROM) 402 or a computer program loaded from a storage unit 408 into a random access memory (RAM) 403. The RAM 403 may also store various programs and data required to operate the device 400. The computing unit 401, the ROM 402 and the RAM 403 are connected to one another by a bus 404. An input/output (I/O) interface 405 is also connected to the bus 404.

A plurality of components in the device 400 are connected to the I/O interface 405, including an input unit 406, such as a keyboard and a mouse; an output unit 407, such as various displays and speakers; a storage unit 408, such as disks and discs; and a communication unit 409, such as a network card, a modem and a wireless communication transceiver. The communication unit 409 allows the device 400 to exchange information/data with other devices over computer networks such as the Internet and/or various telecommunications networks.

The computing unit 401 may be a variety of general-purpose and/or special-purpose processing components with processing and computing capabilities. Some examples of the computing unit 401 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 401 performs the methods and processing described above, such as the method for vehicle control. For example, in some embodiments, the method for vehicle control may be implemented as a computer software program that is tangibly embodied in a machine-readable medium, such as the storage unit 408.

In some embodiments, part or all of a computer program may be loaded and/or installed on the device 400 via the ROM 802 and/or the communication unit 409. One or more steps of the method for vehicle control described above may be performed when the computer program is loaded into the RAM 403 and executed by the computing unit 401. Alternatively, in other embodiments, the computing unit 401 may be configured to perform the method for vehicle control by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a load programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the methods in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, a random access memory (RAM), a read-only memory (ROM), an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network.

A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and a virtual private server (VPS). The server may also be a distributed system server, or a server combined with blockchain.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the extent of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the extent of protection of the present disclosure.

What is claimed is:

1. A method for vehicle control, comprising:
   determining vehicles in a preset geo-fencing region including N lanes, the included lanes having a length of $I_{threshold}$, where N is an integer greater than 1;
   determining a vehicle weight of each of the vehicles according to a vehicle type and a waiting duration of each of the vehicles, the vehicle weight reflecting a priority of passage of a vehicle, and the waiting duration being a duration that has been waited from the time when the vehicle entered a respective lane;
   estimating, according to the vehicle weights of the vehicles in each of the lanes in the geo-fencing region and positions of the vehicles in each of the lanes, a duration to be waited in each of the lanes, comprising: determining a lane weight of each of the lanes according to the vehicle weights of the vehicles in the lanes in the geo-fencing region; and determining, for a first lane with the highest weight, the duration to be waited in the first lane as zero; and for other lanes, determining queuing weights of the vehicles in the other lanes according to the vehicle weights of the vehicles in the other lanes; determining a number of vehicles to be waited by first vehicles in the lanes according to the queuing weights of the vehicles in the lanes, each queuing weight of the vehicles being an average value of weights of a first vehicle and subsequent vehicles after the first vehicle in the lane; and determining durations to be waited in the lanes according to the number of vehicles to be waited by the first vehicles in the lanes and unit time for the vehicles to pass; and
   generating a control instruction for each of the vehicles according to the respective durations to be waited in each of the lanes and the respective positions of the vehicles in each of the lanes, the control instruction comprising a state instruction and a target speed instruction, wherein the state instruction indicates what state each vehicle is in, comprising start, keep, slow and stop, and the target speed instruction indicates what speed each vehicle has achieved.

2. The method according to claim 1, wherein the step of determining vehicles in a preset geo-fencing region comprises: determining vehicle positions, determining whether the vehicle positions fall within the preset geo-fencing region, and determining a road side unit corresponding to the geo-fencing region; and
   the method further comprises:
   sending the control instructions to corresponding vehicles through the road side unit corresponding to the geo-fencing region.

3. The method according to claim 1, further comprising:
   acquiring information of the lanes of the vehicles determined by on board unit combined cameras of the vehicles; or
   acquiring information of the lanes of the vehicles determined by the vehicles according to vehicle positioning results and lane-level map data; or
   acquiring vehicle positioning results, and determining information of the lanes of the vehicles according to lane-level map data deployed in a mobile edge computing device.

4. The method according to claim 1, wherein the step of generating a control instruction for each of the vehicles according to the respective durations to be waited in each of the lanes and the respective positions of the vehicles in each of the lanes comprises:
   generating a start instruction for a vehicle if a current speed of the vehicle is zero, a duration for the vehicle to wait in the lane is zero, and the vehicle is at a first place in the lane;
   generating the start instruction for the vehicle if an estimated start speed of the vehicle is greater than or equal to a preset maximum speed threshold, the estimated start speed being a maximum speed at which the vehicle can be assumed to start and being related to a front spacing of the vehicle and the duration for the vehicle to wait in the lane;
   generating the start instruction for the vehicle if a front spacing of the vehicle is greater than or equal to a preset maximum spacing threshold;
   generating a keep instruction for the vehicle if the estimated start speed of the vehicle is greater than or equal to the current speed of the vehicle;
   generating a slow instruction for the vehicle if the estimated start speed of the vehicle is less than the current speed of the vehicle and greater than a preset minimum speed threshold;
   generating a stop instruction for the vehicle if the estimated start speed of the vehicle is less than or equal to the preset minimum speed threshold; and
   generating the stop instruction for the vehicle if the front spacing of the vehicle is less than or equal to a preset minimum spacing threshold;
   wherein the estimated start speed of the vehicle is determined by the front spacing of the vehicle and the duration for the vehicle to wait in the lane.

5. The method according to claim 1, wherein the step of generating a control instruction for each of the said vehicles according to the respective durations to be waited in each of the lanes and the respective positions of the vehicles in each of the lanes comprises:
   determining a target speed of a vehicle as a preset regular speed if a current speed of the vehicle is zero, a duration for the vehicle to wait in the lane is zero, and the vehicle is at a first place in the lane;
   determining the target speed of the vehicle as the preset regular speed if an estimated start speed of the vehicle is greater than or equal to a preset maximum speed threshold, the estimated start speed being a maximum speed at which the vehicle can be assumed to start and being related to a front spacing of the vehicle and the duration for the vehicle to wait in the lane;

determining the target speed of the vehicle as the preset regular speed if a front spacing of the vehicle is greater than or equal to a preset maximum spacing threshold;

determining the target speed of the vehicle as the current speed if the estimated start speed of the vehicle is greater than or equal to the current speed of the vehicle;

determining the target speed of the vehicle as the estimated start speed of the vehicle if the estimated start speed of the vehicle is less than the current speed of the vehicle and greater than a preset minimum speed threshold, the estimated start speed of the vehicle being determined by the front spacing of the vehicle and the duration for the vehicle to wait in the lane;

determining the target speed of the vehicle as zero if the estimated start speed of the vehicle is less than or equal to the preset minimum speed threshold; and determining the target speed of the vehicle as zero if the front spacing of the vehicle is less than or equal to a preset minimum spacing threshold.

6. An electronic device, comprising:
at least one processor; and
a memory communicatively connected with the at least one processor;
wherein the memory stores instructions executable by the at least one processor, and the instructions are executed by the at least one processor to enable the at least one processor to perform a method for vehicle control, wherein the method comprises:
determining vehicles in a preset geo-fencing region including N lanes, the included lanes having a length of $l_{threshold}$, where N is an integer greater than 1;
determining a vehicle weight of each of the vehicles according to a vehicle type and a waiting duration of each of the vehicles, the vehicle weight reflecting a priority of passage of a vehicle, and the waiting duration being a duration that has been waited from the time when the vehicle entered a respective lane;
estimating, according to the vehicle weights of the vehicles in each of the lanes in the geo-fencing region and positions of the vehicles in each of the lanes, a duration to be waited in each of the lanes, comprising: determining a lane weight of each of the lanes according to the vehicle weights of the vehicles in the lanes in the geo-fencing region; and determining, for a first lane with the highest weight, the duration to be waited in the first lane as zero; and for other lanes, determining queuing weights of the vehicles in the other lanes according to the vehicle weights of the vehicles in the other lanes; determining a number of vehicles to be waited by first vehicles in the lanes according to the queuing weights of the vehicles in the lanes, each queuing weight of the vehicles a being an average value of weights of a first vehicle and subsequent vehicles after the first vehicle in the lane; and determining durations to be waited in the lanes according to the number of vehicles to be waited by the first vehicles in the lanes and unit time for the vehicles to pass; and
generating a control instruction for each of the vehicles according to the respective durations to be waited in each of the lanes and the respective positions of the vehicles in each of the lanes, the control instruction comprising a state instruction and a target speed instruction, wherein the state instruction indicates what state each vehicle is in, comprising start, keep, slow and stop, and the target speed instruction indicates what speed each vehicle has achieved.

7. The electronic device according to claim 6, wherein the step of determining vehicles in a preset geo-fencing region comprises: determining vehicle positions, determining whether the vehicle positions fall within the preset geo-fencing region, and determining a road side unit corresponding to the geo-fencing region; and the method further comprises:
sending the control instructions to corresponding vehicles through the road side unit corresponding to the geo-fencing region.

8. The electronic device according to claim 6, further comprising:
acquiring information of the lanes of the vehicles determined by on board unit combined cameras of the vehicles; or
acquiring information of the lanes of the vehicles determined by the vehicles according to vehicle positioning results and lane-level map data; or
acquiring vehicle positioning results, and determining information of the lanes of the vehicles according to lane-level map data deployed in a mobile edge computing device.

9. The method according to claim 1, wherein the step of generating a control instruction for each of the vehicles according to the respective durations to be waited in each of the lanes and the respective positions of the vehicles in each of the said lanes comprises:
generating a start instruction for a vehicle if a current speed of the vehicle is zero, a duration for the vehicle to wait in the lane is zero, and the vehicle is at a first place in the lane;
generating the start instruction for the vehicle if an estimated start speed of the vehicle is greater than or equal to a preset maximum speed threshold, the estimated start speed being a maximum speed at which the vehicle can be assumed to start and being related to a front spacing of the vehicle and the duration for the vehicle to wait in the lane;
generating the start instruction for the vehicle if a front spacing of the vehicle is greater than or equal to a preset maximum spacing threshold;
generating a keep instruction for the vehicle if the estimated start speed of the vehicle is greater than or equal to the current speed of the vehicle;
generating a slow instruction for the vehicle if the estimated start speed of the vehicle is less than the current speed of the vehicle and greater than a preset minimum speed threshold;
generating a stop instruction for the vehicle if the estimated start speed of the vehicle is less than or equal to the preset minimum speed threshold; and
generating the stop instruction for the vehicle if the front spacing of the vehicle is less than or equal to a preset minimum spacing threshold;
wherein the estimated start speed of the vehicle is determined by the front spacing of the vehicle and the duration for the vehicle to wait in the lane.

10. The method according to claim 1, wherein the step of generating a control instruction for each of the vehicles according to the respective durations to be waited in each of the lanes and the respective positions of the vehicles in each of the lanes comprises:

determining a target speed of a vehicle as a preset regular speed if a current speed of the vehicle is zero, a duration for the vehicle to wait in the lane is zero, and the vehicle is at a first place in the lane;

determining the target speed of the vehicle as the preset regular speed if an estimated start speed of the vehicle is greater than or equal to a preset maximum speed threshold, the estimated start speed being a maximum speed at which the vehicle can be assumed to start and being related to a front spacing of the vehicle and the duration for the vehicle to wait in the lane;

determining the target speed of the vehicle as the preset regular speed if a front spacing of the vehicle is greater than or equal to a preset maximum spacing threshold;

determining the target speed of the vehicle as the current speed if the estimated start speed of the vehicle is greater than or equal to the current speed of the vehicle;

determining the target speed of the vehicle as the estimated start speed of the vehicle if the estimated start speed of the vehicle is less than the current speed of the vehicle and greater than a preset minimum speed threshold, the estimated start speed of the vehicle being determined by the front spacing of the vehicle and the duration for the vehicle to wait in the lane;

determining the target speed of the vehicle as zero if the estimated start speed of the vehicle is less than or equal to the preset minimum speed threshold; and determining the target speed of the vehicle as zero if the front spacing of the vehicle is less than or equal to a preset minimum spacing threshold.

11. A vehicle control system, comprising: an on board unit arranged in a vehicle, a road side unit and a mobile edge computing device;

the on board unit being configured to send information of the vehicle to the road side unit after establishing a connection with the road side unit; receive a control instruction sent by the road side unit and send the control instruction to the vehicle control system to execute the control instruction;

the road side unit being configured to send the received information of the vehicle to the mobile edge computing device after establishing a connection with the on board unit; and forward a control instruction sent by the mobile edge computing device to the on board unit of the corresponding vehicle; and the mobile edge computing device comprising at least one processor; and a memory communicatively connected with the at least one processor;

wherein the memory stores instructions executable by the at least one processor, and the instructions are executed by the at least one processor to enable the at least one processor to perform a method, wherein the method comprises:

determining vehicles in a preset geo-fencing region including N lanes, the included lanes having a length of $l_{threshold}$, where N is an integer greater than 1;

determining a vehicle weight of each of the vehicles according to a vehicle type and a waiting duration of each of the vehicles, the vehicle weight reflecting a priority of passage of a vehicle, and the waiting duration being a duration that has been waited from the time when the vehicle entered a respective lane;

estimating, according to the vehicle weights of the vehicles in each of the lanes in the geo-fencing region and positions of the vehicles in each of the lanes, a duration to be waited in each of the lanes, comprising:

determining a lane weight of each of the lanes according to the vehicle weights of the vehicles in the lanes in the geo-fencing region; and determining, for a first lane with the highest weight, the duration to be waited in the first lane as zero; and for other lanes, determining queuing weights of the vehicles in the other lanes according to the vehicle weights of the vehicles in the other lanes; determining a number of vehicles to be waited by first vehicles in the lanes according to the queuing weights of the vehicles in the lanes, each queuing weight of the vehicles being an average value of weights of a first vehicle and subsequent vehicles after the first vehicle in the lane; and determining durations to be waited in the lanes according to the number of vehicles to be waited by the first vehicles in the lanes and unit time for the vehicles to pass; and generating a control instruction for each of the vehicles according to the respective durations to be waited in each of the lanes and the respective positions of the vehicles in each of the lanes, the control instruction comprising a state instruction and a target speed instruction, wherein the state instruction indicates what state each vehicle is in, comprising start, keep, slow and stop, and the target speed instruction indicates what speed each vehicle has achieved.

12. A non-transitory computer-readable storage medium storing computer instructions therein, wherein the computer instructions are used to cause the computer to perform a method for vehicle control, wherein the method comprises:

determining vehicles in a preset geo-fencing region including N lanes, the included lanes having a length of $l_{threshold}$, where N is an integer greater than 1;

determining a vehicle weight of each of the vehicles according to a vehicle type and a waiting duration of each of the vehicles, the vehicle weight reflecting a priority of passage of a vehicle, and the waiting duration being a duration that has been waited from the time when the vehicle entered a respective lane;

estimating, according to the vehicle weights of the vehicles in each of the lanes in the geo-fencing region and positions of the vehicles in each of the lanes, a duration to be waited in each of the lanes, comprising:

determining a lane weight of each of the lanes according to the vehicle weights of the vehicles in the lanes in the geo-fencing region; and determining, for a first lane with the highest weight, the duration to be waited in the first lane as zero; and for other lanes, determining queuing weights of the vehicles in the other lanes according to the vehicle weights of the vehicles in the other lanes; determining a number of vehicles to be waited by first vehicles in the lanes according to the queuing weights of the vehicles in the lanes, each queuing weight of the vehicles being an average value of weights of a first vehicle and subsequent vehicles after the first vehicle in the lane; and determining durations to be waited in the lanes according to the number of vehicles to be waited by the first vehicles in the lanes and unit time for the vehicles to pass; and generating a control instruction for each of the vehicles according to the respective durations to be waited in each of the lanes and the respective positions of the vehicles in each of the lanes, the control instruction comprising a state instruction and a target speed instruction, wherein the state instruction indicates what state each vehicle is in, comprising start, keep, slow and stop, and the target speed instruction indicates what speed each vehicle has achieved.

13. The non-transitory computer-readable storage medium according to claim 12, wherein the step of determining vehicles in a preset geo-fencing region comprises:
- determining vehicle positions, determining whether the vehicle positions fall within the preset geo-fencing region, and determining a road side unit corresponding to the geo-fencing region; and the method further comprises:
- sending the control instructions to corresponding vehicles through the road side unit corresponding to the geo-fencing region.

14. The non-transitory computer-readable storage medium according to claim 12, further comprising:
- acquiring information of the lanes of the vehicles determined by on board unit combined cameras of the vehicles; or
- acquiring information of the lanes of the vehicles determined by the vehicles according to vehicle positioning results and lane-level map data; or
- acquiring vehicle positioning results, and determining information of the lanes of the vehicles according to lane-level map data deployed in a mobile edge computing device.

* * * * *